Figure 1:
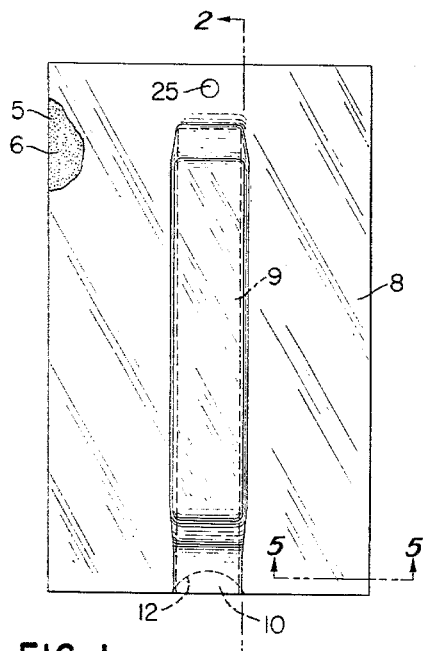

May 31, 1966  C. B. STOKER, JR  3,253,705
SKIN-PACKAGE
Filed Sept. 5, 1962  2 Sheets-Sheet 1

INVENTOR.
CARL B. STOKER, JR.
BY
J.B. Holden
ATTORNEY

May 31, 1966    C. B. STOKER, JR    3,253,705
SKIN-PACKAGE

Filed Sept. 5, 1962    2 Sheets-Sheet 2

INVENTOR.
CARL B. STOKER, JR.
BY
*J.B. Holden*
ATTORNEY

United States Patent Office 3,253,705
Patented May 31, 1966

3,253,705
SKIN-PACKAGE
Carl B. Stoker, Jr., Akron, Ohio, assignor to The Goodyear Tire & Rubber Company, Akron, Ohio, a corporation of Ohio
Filed Sept. 5, 1962, Ser. No. 221,559
6 Claims. (Cl. 206—56)

This invention relates to a new type of skin-package.

The principle of skin-packaging has been widely used. In such a package the thing to be packaged is placed on a perforated backing which has a heat-sealable surface. A flexible, imperforate, thermostretchable cover sheet is placed over this. Heat is applied, and then vacuum draws the cover sheet over the thing to be packaged, and stretches the sheet into intimate contact with it, and into sealing contact with the surface of the backing. Thus the cover sheet and backing are heat-sealed together with the thing held tight between them.

The invention pertains to an improvement in a skin-package in which the material packaged is a long length of flexible material to which neither the cover sheet nor the heat-sealable surface of the backing adheres when heated. The long length is arranged in an orderly fashion in a dispensable bulk, with one end extended and lying flat against the backing when the cover sheet is sucked by vacuum against it and sealed to the surface of the backing. Heat is applied in any usual way to effect the heat seal. The material being packaged is of such a composition that neither the cover sheet nor the heat-sealable surface of the backing adheres to it at the temperature and under the pressure employed in the skin-packaging operation. When the package is completed, the bulk of the long length is held tight between the cover sheet and the backing with one end extending to the edge of the cover sheet and/or the backing through a channel formed between the cover sheet and backing during the packaging operation. The packaged material is withdrawn through this channel from time to time, as required.

Ordinarily, the cover sheet covers the whole of the backing and is commensurate with it. As is customary in present practice, a number of things are packaged on one large backing under one cover sheet, in a single operation, and then this is cut up into individual units. In a preferred embodiment of the invention, a finger hold is cut in one edge of the backing (or a hole is cut common to two backing areas where they join) before applying the cover sheet. The extended end of the material being packaged is brought into this finger hold (or an extended length joining two bulks of the material to be packaged, is brought across the common hole), and then the cover sheet is sucked down over this, and the sheet and backing are then cut into individual units (and if a stretch of the material being packaged extends over a common hole, this is severed simultaneously).

The invention will be more particularly described in connection with (1) a package of bias tape in which the tape is folded in layers under the film and (2) in connection with faucet packing composed of a string treated with graphite and oil and coiled under the film. It is to be understood that the invention is not limited to these two packages, or to the packaging of these particular materials.

Figure 2:
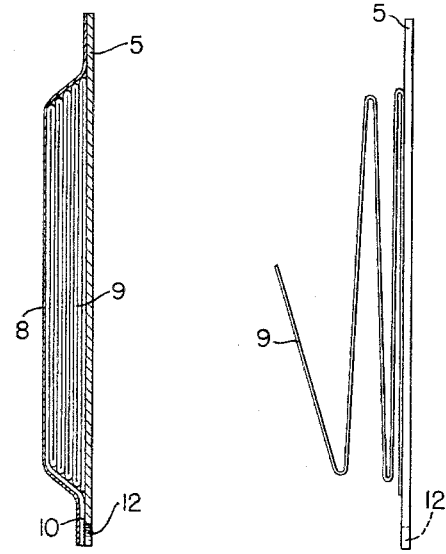
Figure 3:
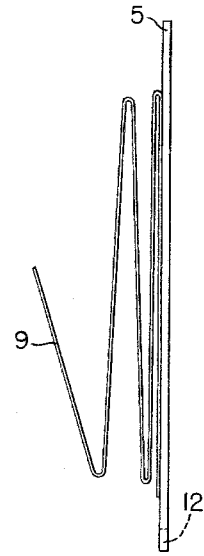
Figure 4:
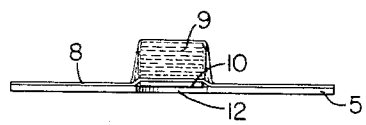
Figure 5:
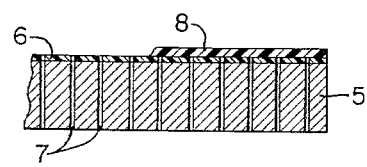
Figure 6:
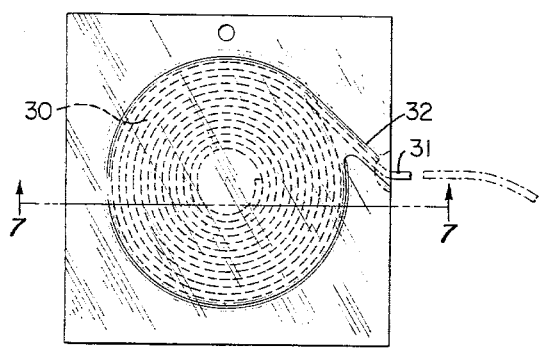
Figure 7:
Figure 8:
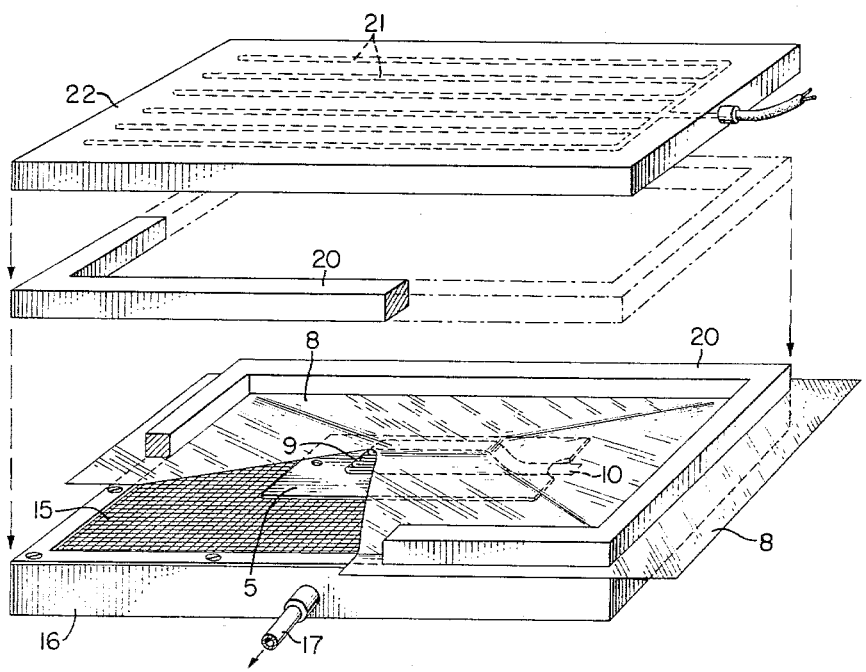

The invention is further described in connection with the accompanying drawings, in which FIGURE 1 is a plan view of a package of bias tape;
FIGURE 2 is a section on the line 2—2 of FIGURE 1;
FIGURE 3 is a similar section before the cover sheet is applied, illustrating how the tape is folded in layers;
FIGURE 4 is an end view of the package;
FIGURE 5 is an enlarged view of the backing;
FIGURE 6 is a plan view of a package of coiled packing;

FIGURE 7 is a section on the line 7—7 of FIGURE 6; and
FIGURE 8 is a schematic view in perspective of equipment as it is used in the process.

The backing can have any one of many suitable structures. Advantageously it is composed of a stiff cardboard, and one surface is coated with a heat-sealable coating. The backing may be metal with a heat-sealable film laminated to it. It may be a sheet composed entirely of a heat-sealable plastic. Usually it is stiff, but this is not necessary. The drawings show cardboard backing 5 with one surface coated with a composition 6 which contains a high percentage of heat-sealable vinyl polymer, and then perforated with fine, closely spaced openings 7.

The cover sheet is usually, but not necessarily, transparent. The drawings illustrate the use of a film 8 of vinyl chloride which may be 1 mil thick. Various backings and cover sheets with mutually heat-sealable surfaces are available on the market.

FIGURES 1, 2 and 4 show a layered bulk 9 of bias tape between the backing 5 and cover sheet 8, with one end 10 of the tape extending to an edge of the package. At the end of the tape, the backing is cut away to form finger hold 12. This is covered by the cover sheet. The end 10 of the tape extends across the finger hold to the edge of the cover sheet.

When a person wants some of the tape, he presses a finger up through the finger hold 12 against the end of the tape 10, and then draws the tape forward. When the end is brought beyond the edge of the film it can be grasped by both fingers. Any desired amount of the tape is withdrawn. Within the package it is folded so that the layer adjacent the cover sheet is always withdrawn first, although it might be arranged so that the layer adjacent the backing is withdrawn first. The desired amount is cut off and the remainder is left under the cover sheet.

In making the package (FIGURE 8), the backing 5 is supported on the screen 15 over the partitioned vacuum chamber 16, the vacuum pump being connected at 17. The tape 9 is bulked together by folding equal lengths layer on layer (FIGURE 3). The outer end 10 of the tape extends forward from the bulk of the tape, and lies flat on the backing. The cover sheet 8 is held in place by the frame 20 with clamps (not shown).

Heat is supplied as from heating coils 21 on the under side of the cover 22 of the packaging equipment when the cover 22 is lowered to a suitable distance above the cover sheet. The coil may be heated before or after lowering the cover. The cover sheet is softened and becomes limp and lies as flat as possible over the tape and against the top surface of the backing. The vacuum draws the heated film down tight against the top of the tape and the top of the backing. The heat raises the temperature of the backing 5 to the point where the surface is heat-sealable so that when the vacuum draws the heated cover sheet to it, the two are sealed together over the whole surface of the backing except where the bulk and extended end of the bias tape intervene. Excess film and/or backing are cut away, and if several packages are made from a single backing and/or cover sheet they are cut apart. The tape is not heat sealable, so neither the cover sheet nor the coating 6 adheres to it. Therefore, after the packaging operation, any desired length of the tape is easily withdrawn from the package.

Any equipment used in skin-packaging may be employed. The cover sheet need not cover the whole of the backing, but usually it does. Any source of heat may be used. The operation can be carried out on a continuous basis in suitable equipment. Two or more different sizes of bias tape may be packaged on the same final backing unit, and then the ends of the different tapes may extend to different edges of the backing. Many modifications in the process and package are possible, and a great variety of materials sold in long lengths can be packaged in this way. The package shown includes the hole 25, so that the package can be hung in a convenient place. This is optional.

Instead of bulking the long length of the packaged material in layers, it may be rolled up. FIGURES 6 and 7 show a roll 30 of packing, such as used by a plumber. The outer end 31 is extended beyond the edge of the package. The roll is not centered so as the packing is withdrawn it is pulled to one edge of the enclosure, and gradually shifts further and further from the other edge, until finally there is but a small roll immediately adjacent the exit channel 32.

It is a common experience that when bias tape or any other long length of material packaged in a roll or in layers or the like, is accidently dropped, the bulk of the material loses its original shape and henceforth is not easily handled. The object of the invention is to confine such materials in a skin-package which holds the bulk of the material in an orderly arrangement while the required amount is withdrawn and used. Any long length of material to which the packaging material does not adhere when heated can be skin-packaged. The long length of the material may be bulked under the film in any desirable dispensable form. There is no opportunity for the material to become snarled.

The foregoing disclosure is illustrative. The invention is covered in the claims which follow.

What I claim is:

1. A skin-package of a flexible, imperforate, thermostretchable cover sheet and a stiff perforated backing having surfaces thereof sealed together, with a portion of said surfaces not sealed together and between the unsealed surfaces, an orderly arranged, dispensable bulk of a long length of flexible material in free contact with the sealed surfaces surrounding and closely conforming to the same except for one end of the long length which is extended from the bulk beyond an edge of at least one of said two packaging materials so that on pulling said end the packaged material is elongated and removed from the package.

2. The package of claim 1 in which there is a finger hold at one edge of the backing, the cover sheet is over the finger hold, and said end extends at least into the finger hold.

3. The package of claim 1 in which the long length of flexible material is bias tape.

4. The package of claim 1 in which the long length of flexible material is packing.

5. The package of claim 1 in which the long length of flexible material is rolled into a substantially cylindrical bulk with its axis perpendicular to the backing.

6. The package of claim 1 in which the long length of flexible material is folded back in planes parallel to the backing.

References Cited by the Examiner
UNITED STATES PATENTS

| | | | |
|---|---|---|---|
| 2,750,719 | 6/1956 | Wandelt | 206—80 |
| 2,861,404 | 11/1958 | Stratton | 206—80 |
| 2,861,405 | 11/1958 | Hanford | 206—80 |
| 2,984,056 | 5/1961 | Scholl | 206—80 |
| 3,062,366 | 11/1962 | Palmer | 206—78 |

JOSEPH R. LE CLAIR, *Primary Examiner.*

EARLE J. DRUMMOND, *Examiner.*